Aug. 25, 1942.   D. J. AYERS ET AL   2,294,329
BRAKE
Filed May 13, 1940
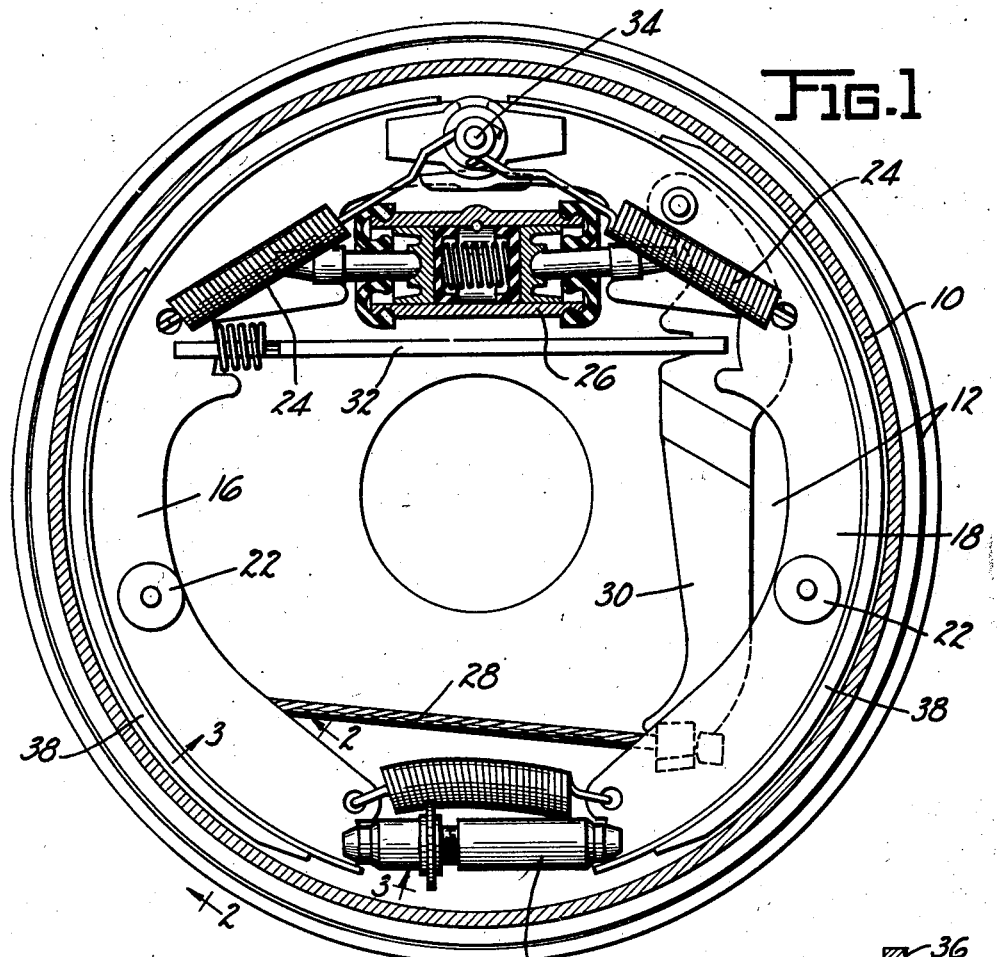
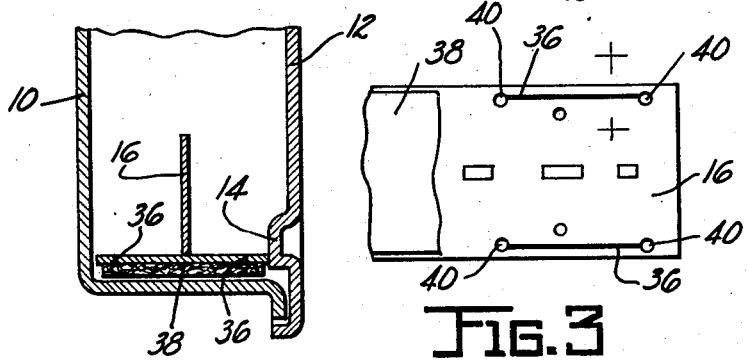
INVENTOR
DONALD J. AYERS
ROBERT L. STREBINGER
BY
M. W. McConkey
ATTORNEY Patented Aug. 25, 1942

2,294,329

UNITED STATES PATENT OFFICE 2,294,329

BRAKE

Donald J. Ayers and Robert L. Strebinger, South Bend, Ind., assignors to Bendix Aviation Corporation, South Bend, Ind., a corporation of Delaware Application May 13, 1940, Serial No. 334,728

2 Claims. (Cl. 188—78)

This invention relates to brakes, and is illustrated as embodied in an internal expanding brake for an automobile.

An object of the invention is to position the shoes by engagement of the edges of the rims with projections or ledges on the backing plate, and to prevent the rubbing movement of the shoes on these projections from causing undesirable noise. This is accomplished by slitting the shoe rims, as described below, opposite the projections on the backing plate.

The above and other objects and features of the invention will be apparent from the following description of the brake shown in the accompanying drawing, in which:

Figure 1 is a section through the brake, just inside the head of the brake drum, and showing the shoes in side elevation;

Figures 2 and 3 are partial sections on the lines 2—2 and 3—3 of Figure 1; and

Figure 4 is a partial section through one shoe rim, illustrating the slitting of the rim.

The brake illustrated includes a drum 10, at the open side of which is a support such as a backing plate 12 formed with projections or ledges 14 for positioning brake shoes 16 and 18. These shoes are connected by an adjustable strut 20, and are provided with suitable steady rests 22 and return springs 24. The shoes are applied alternatively by a wheel cylinder type hydraulic applying device 26, or by a mechanical applying device such as a cable 28 actuating a lever 30 and strut 32. One shoe or the other anchors, when the brake is applied, on an anchor pin 34.

It will be noted that the edges of the rims of the shoes rub against projections or ledges 14 when the brake is applied or released. To prevent this causing a squeaky noise, on account of this metal-to-metal rubbing contact, the rims of the shoes are formed with slits 36 near their edges, and extending lengthwise of the shoes, opposite these projections 14. Figure 3 shows this arrangement, the brake lining 38 being broken away in this figure to show the face of the shoe rim. Slits may be provided at both sides of the rim, so that the shoes 16 and 18 will be interchangeable.

These slits 36 may be formed, without removing metal, by shearing the metal of the rim and bending down tongues extending between holes 40 (Figure 3), in the manner shown in dotted lines in Figure 4, and then pressing these tongues back flush with the rim again.

While one particular brake has been described, it is not our intention to limit the scope of the invention to that particular brake, or otherwise than by the terms of the appended claims.

We claim:

1. A brake having a backing plate provided with positioning projections, and brake shoes having rims engageable at their edges with said projections, said rims having slits extending lengthwise of the shoes near the edges of the rim opposite said projections.

2. A brake having a backing plate provided with positioning projections, and brake shoes engageable at their edges with said projections, said brake shoes having slits opposite said projections.

DONALD J. AYERS.
ROBERT L. STREBINGER.